3,509,208
ARYLACYL-ω-AMINOCARBOXYLIC ACIDS
Harvey E. Alburn, West Chester, Norman H. Grant, Wynnewood, and Donald E. Clark, Norristown, Pa., assignors to American Home Products Corporation, New York, N.Y., a corporation of Delaware
No Drawing. Filed Dec. 16, 1966, Ser. No. 603,707
Int. Cl. C07c *101/44*
U.S. Cl. 260—518                                8 Claims

ABSTRACT OF THE DISCLOSURE

The compounds are arylacyl-ω-aminocarboxylic acids which are useful in the suppression of the immune response in warm-blooded animals.

---

This invention relates generally to novel chemical compounds having valuable pharmacodynamic properties, to processes for preparing said compounds, and to a method of blocking auto-immune processes in warm-blooded animals with the use of said compounds.

The novel compounds of the invention are the arylacyl-ω-aminocarboxylic acids encompassed within the following general formula:

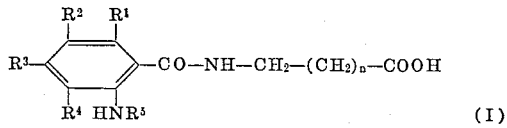

wherein $R^1$, $R^2$, $R^3$ and $R^4$ are each selected from the group consisting of hydrogen, alkyl, alkoxy, amino, nitro, halo, sulfo and chlorosulfo; $R^5$ may be selected from the group consisting of hydrogen and lower alkyl; and $n$ is an integer from 2 to 6.

The novel compounds of Formula I may conveniently be prepared by heat-reacting a selected isatoic anhydride with a suitable ω-aminocarboxylic acid in accordance with the following reaction scheme:

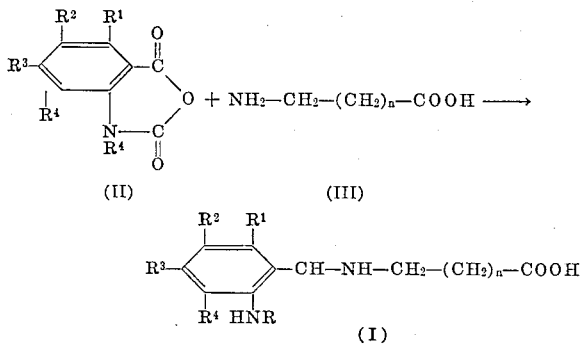

wherein $R^{1-5}$ and $n$ have the same meanings described hereinbefore.

Many of the reactants (II) and (III) employed in the process illustrated by the above reaction scheme are known compounds which are readily available from commercial sources. Others which are not commercially available can easily be prepared in accordance with standard organic procedures well known to those skilled in the art. For example, a procedure which has been employed to synthesize the isatoic anhydrides of Formula II above utilized in the preparation of the compounds I of the present invention, is described in U.S. Patent 3,213,083, "6-(α-Aminoacylamino)-Penicillanic Acids," H. E. Alburn, N. H. Grant, and H. Fletcher, 3rd.

It has been discovered that compounds of Formula I meeting the described qualifications have valuable pharmacological properties. More specifically, said compounds have been found to have unexpected anti-immune activity, as referred to in greater detail hereinafter.

The immune response, i.e., production of antibodies, is the means by which immunity to infectious disease is generated, and is an expression of the animal body's biochemical integrity. Malfunctions of this natural defense mechanism are known collectively as the immunopathies. These are characterized by altered response to external antigens, i.e., the manifestation of atopy or an allergy. They also include the auto-immune phenomena. The body is normally tolerant to its own tissues and does not treat them as antigens (foreign substances). A breakdown of this tolerance (natural homoestatic mechanisms) is the basis of those pathologic entities grouped under the term, auto-immune diseases. In addition to the immunopathies, normal functioning of the immune system can be disadvantageous, for example, by causing rejection of transplanted tissues or organs. Obviously, suppression of the immune response can be of major therapeutic importance in particular instances.

Suppression of the immune response was initially observed after X-ray and cortisone treatment, and can now be achieved by certain of the agents initially developed for use in cancer chemotherapy. In addition to the corticosteroids, these compounds can be divided into three major classifications; the alkylating agents (nitrogen mustards), purine antimetabolites (6-mercaptopurine) and the folic acid antagonists (methotrexate). Remarkable success in the treatment of non-neoplastic (auto-immune) diseases, and prolongation of homografts with these antineoplastic agents has stimulated research into this area of increasing interest and practical importance. Specific auto-immune diseases treated with antimetabolites include systemic lupus erythematosus, thyroiditis, polyradiculoneuropathy, forms of male sterility, immuno-allergic lung purpura, psooriasis, nephrosis, hepatitis, rheumatoid arthritis, auto-immune hemolytic anemia, idiopathic thrombocytopenic purpura, erythema nodosum, periarteritis nodosa, idiopathic plasmocytosis, atopic dermatitis, systemic scleroderma, sarcoidosis, amyloidosis, myasthenia gravis, multiple sclerosis and other demyelinating diseases of the central nervous system, including diffuse scleroderma, heart disease, Sjorgren's syndrome, ulcerative colitis, sympathetic ophthalmia, uveitis, Addison's disease, pernicious anemia, polymyositis and dermatomyositis. Additionally, reports of auto-immune phenomena have been found associated with leprosy, tuberculosis and other infectious diseases. As a practical goal in the treatment of these immunologic diseases, and in prolonging homograft survival; the possibility of selectively suppressing the immune response of an adult animal to a specific antigen is clearly of major importance.

Unfortunately, of the heretofore known groups of compounds referred to above as having the desirable anti-immune activity; the alkylating agents are known to be carcinogenic and mutagenic, while the purine analogues are potentially so since they are incorporated into DNA. Further, the toxicity of the folic acid antagonists and corticosteroids are well known. Thus, from the method of treatment aspect of the present invention, such invention, in its broadest concept, also resides in the method of blocking an auto-immune process in a warm-blooded animal by administering to said animal, in which said auto-immune process is undesirable, a therapeutically active amount of a compound selected from the group consisting of those having the general Formula I as defined hereinbefore.

It has been well established that agents which are effective in human auto-immune diseases are active also in preventing both the clinical and histopathologic changes which occur when test animals are challenged intravenously or orally with pre-treated sheep red cells, as referred to in greater detail hereinafter. Such agents include the compounds of thioguanine, Imuran, 6-mercaptopurine, cyclophosphamide, methotrexate and cortisone, all of which have been shown to be active in human immunopathies. Thus, the aforesaid challenge of test animals dosed with a specific compound may serve as a test standard for activity of other compounds with respect to the suppression of auto-immune processes in general. (c.f. H. C. Nathan et al. "Detection of Agents Which Interfere with the Immune Response"; Soc. Expt. Biol. & Med., 107, 796 (1961).

In accordance with the test described in the Nathan et al. article identified above, preliminary preparations therefor are as follows: Male albino mice, having a body weight of 18–20 gms. are selected as the test animals. The test standard compound is 6-mercaptopurine; and the vehicle for both the test standard compound and the compounds to be tested for the anti-immune activity, comprises a 0.5 percent solution of carboxymethyl cellulose (CMC) in distilled water (USP). The challenging material (i.e., the antigen) used in the test is prepared by (a) exposing sterile, washed sheep cells for 10 min. at 37° C. to an equal volume of 1:10,000 tannic acid in buffered saline solution, (b) collecting the treated cells by centrifugation; (c) washing the cells with similar buffered saline; (d) then resuspending the cells in the aforesaid 0.5 percent solution of CMC in distilled water. The buffered saline is preferably comprised of saline (0.85 percent NaCl) mixed with an equal volume of buffer (29.9 ml. M/15 $KH_2PO_4$+76.0 ml. M/15 $Na_2HPO_4$).

In the actual procedure of the Nathan et al. test, the test animals are initially challenged intravenously with 0.25 ml. of a 30 percent buffered suspension of sheep red cells which have been pretreated as described hereinbefore. Treatment of the test animals with the selected test agent and the reference standard, 6-mercaptopurine, is initiated immediately after injection of the aforesaid antigen. Appropriate untreated antigen control animals are included. At selected intervals of time, the mice are bled from the heart, the serum separated and pooled for each treatment group and the hemagglutinin titer determined by serial 2-fold dilutions in test tubes as described by A. B. Stavitsky, J. Immunol. 72, 360 (1964) and/or by the known microtiter method employing cup plate assemblies. The hemagglutinin is the host's antibody to the antigen, sheep red cells.

The activity of the compounds tested with respect to suppression of the auto-immune response is determined as follows:

The score for each tube is multiplied by the appropriate exponent of the 2-fold dilution series, and the values summed for each series. The index of drug effect for the compound under test is obtained as a ratio of these sums for the treated to the untreated control, as set forth in the aforesaid Nathan et al. article, wherein the antibody index (A.I.) is determined in accordance with the following formula:

$$A.I. = \frac{\Sigma(S_1 + 2S_2 + 3S_3 + \ldots nS_n)_T}{\Sigma(S_1 + 2S_2 + 3S_3 + \ldots nS_n)_S}$$

wherein

T=treated series
C=control series
n=the exponent of dilution (tube number in the 2-fold series); and
S=the agglutination score.

The surprising efficacy of the compounds of Formula I above in the accepted test described hereinbefore has clearly indicated that they are extremely active, relatively non-toxic, long-acting immuno-suppressive agents. On such basis, it has been found that, when compared to the standard compounds known to the art, said compounds of Formula I have been found to be effective, both in the treatment of the chronic immunologic diseases mentioned previously, and in organ and tissue transplantation. Further, their long duration of action has indicated that only relatively low and infrequent dose schedules are required to obtain therapeutic effectiveness.

In the exercising of the method of the invention, the compounds of Formula I used therein may be administered alone or in combination with pharmaceutically acceptable carriers, the proportion of which is determined by the solubility and chemical nature of the compound selected, the chosen route of administration, and standard pharmaceutical practice. For example, they may be administered orally in the form of tablets or capsules, which may contain conventional excipients, or in the form of solutions; or they may be injected parenterally, that is intramuscularly, intravenously or subcutaneously. For parenteral administration, they may be used in the form of sterile solutions containing other solutes, for example, enough saline or glucose to make the solutions isotonic.

The dosage of the present therapeutic agents will vary with the form of administration and the particular compound chosen. It will generally be found that when the composition is administered orally, larger quantities of the active agent will be required to produce the same effect as a smaller quantity given parenterally. In general, the compounds of this invention are most desirably administered at a concentration level that will generally afford effective results without causing any harmful or deleterious side effects, and preferably at a level that is in the range of from about 5 mg. to about 300 mg. per kg. of body weight per day, although as aforementioned, variations will occur. However, a dosage level that is in the range of from about 10 mg. to about 100 mg. per kg. of body weight per day is most desirably employed in order to achieve effective results.

The following examples are illustrative of the preparation of the novel compounds useful in the method of invention and of the exercising of the latter, but are not to be considered necessarily limitative thereof:

EXAMPLE I 6-(2-aminobenzamido)hexanoic acid (A) ω-Aminocaproic acid (3 g.) was refluxed in 100 ml. of pyridine for 15 minutes. Isatoic anhydride (3.7 g.) was added and the mixture was refluxed 15 minutes longer, after which more isatoic anhydride (0.5 g.) was added, followed by a final 15 minute reflux. The solution was evaporated to an oil, water was added, and the solution evaporated to dryness. The residue was washed thoroughly with ethyl ether and then with water, and finally, dried. The product weighed 2.4 g., and storage of the ether washes in the cold ultimately yielded an additional 1.3 g. of product.

Calcd. for $C_{13}H_{18}N_2O_3$ (percent): C, 62.47; H, 7.20; N, 11.2. Found (percent): C, 62.4; H, 6.99; N, 10.9.

(B) When administered intraperitoneally to mice at 300 mg./kg., the compound interfered with the inductive phase of antibody production giving an antibody index of 0.19. This compares with the normal control value of 0.00 and the antigen control value of 1.00.

EXAMPLE II 6-(2-amino-5-chlorobenzamido)hexanoic acid

A mixture of 3 g. of 6-aminohexanoic acid and 200 ml. of pyridine was brought to reflux, and then 4.5 g. of 6-chloroisatoic anhydride was added. The system was refluxed for 1 hour, then cooled to room temperature. It was evaporated to dryness, and the residue was washed successively with ethanol and water and then dried. The product weighed 4.8 g. and gave the following analyses:

Calcd. for $C_{13}H_{17}N_2O_3Cl$ (percent): C, 54.9; H, 6.0; N, 9.8. Found (percent): C, 54.9; H, 6.0; N, 9.4.

The antibody index for 300 mg. per kg. administered intraperitoneally to mice was 0.30, compared with 1.00 for the antigen control.

EXAMPLE III 5-(2-amino-5-nitrobenzamido)pentanoic acid

A mixture of 4.85 g. of 5-aminopentanoic acid, 8.58 g. of 6-nitroisatoic anhydride, and 100 ml. of pyridine was refluxed for one hour. After cooling, the mixture was filtered, the filtrate was evaporated to dryness, and the residue was crystallized from hot water to give the titled product.

Calcd. for $C_{12}H_{15}N_3O_5$ (percent): C, 51.3; H, 5.3; N, 14.9. Found (percent): C, 50.2; H, 5.2; N, 14.6.

EXAMPLE IV 4-(2-amino-5-nitrobenzamido)butyric acid

A mixture of 4 g. of 4-aminobutyric acid, 8 g. of 6-nitroisatoic anhydride, and 100 ml. of pyridine was refluxed for one hour. After cooling to room temperature, the solution was evaporated to an oil, the oil was mixed with 200 ml. of water, and the total mixture evaporated to dryness. The residue was crystallized from hot water, giving 7.6 g. of product.

Calcd. for $C_{11}H_{13}N_3O_5$ (percent): C, 49.5; H, 4.9. Found (percent): C, 49.3; H, 4.8.

EXAMPLE V 4-(o-aminobenzamido)butyric acid, hydrochloride

A mixture of 10 g. of 4-aminobutyric acid, 16 g. of isatoic anhydride, and 100 ml. of pyridine was refluxed for 1 hour, then cooled to room temperature and concentrated to an oil. After adding 100 ml. of water, 12 ml. of concentrated HCl, and 5 g. of charcoal; the resultant suspension was refluxed for 10 minutes and filtered The filtrate was evaporated to dryness. The residue was dissolved in 100 ml. ethanol, and ethyl ether was added to the first permanent turbidity. After standing for 3 days at −18°, the system was filtered, giving 18.6 g. of crystalline hydrochloride.

Calcd. for the monoethanolate of the titled compound (percent): C, 51.3; H, 6.9; N, 9.2. Found (percent) C, 52.1; H, 6.7; N, 9.1.

EXAMPLE VI 5-(o-aminobenzamido)pentanoic acid, hydrochloride

Employing the method of Example V, but replacing the 4-aminobutyric acid by 10 g. of 5-aminopentanoic acid, and changing the amount of isatoic anhydride to 14 g.; gave 14.4 g. of the desired hydrochloride.

Calcd. for $C_{12}H_{16}N_2O_3 \cdot HCl$ (percent): C, 52.8; H, 6.2; Cl, 13.0. Found (percent): C, 52.5; H, 6.1; Cl, 13.6.

EXAMPLE VII 6-(2-amino-5-nitrobenzamido)hexanoic acid, hydrochloride

Following the method of Example III, but in this instance replacing 5-aminopentanoic acid by 10 g. of 6-aminohexanoic acid, and changing the amount of the 6-nitroisatoic anhydride to 15.9 g.; gave 13.8 g. of the desired product.

Calcd. for $C_{13}H_{17}N_3O_5$ (percent): C, 52.8; H, 5.8; N, 14.2. Found (percent): C, 52.2; H, 6.0; N, 14.2.

EXAMPLES VIII–XIV

Again, following the procedure of Example I, other isatoic anhydrides are reacted with ω-aminocarboxylic acid to obtain the products given in the following Table B:

TABLE B

| Ex. | Isatoic Anhydride | ω-Aminocarboxylic Acid | Product |
|---|---|---|---|
| VIII | 6-methoxyisatoic anhydride. | ω-Aminocaproic acid. | 6-(2-amino-6-methoxy-benzamido)hexanoic acid. |
| IX | 4-ethoxyisatoic anhydride. | ----do---- | 6-(2-amino-4-ethoxy-benzamido)hexanoic acid. |
| X | 5-aminoisatoic anhydride. | ω-Aminooctanoic acid. | 8-(2,5-diamino-benzamido)-octanoic acid. |
| XI | 3-ethylisatoic acid. | ω-aminobutyric acid. | 4-(2-amino-3-ethyl-benzamido)butyric acid. |
| XII | 4-hydroxyisatoic acid. | ω-Aminoheptanoic acid. | 7-(2-amino-4-hydroxy-benzamido)heptanoic acid. |
| XIII | 4-bromoisatoic anhydride. | ω-Aminocaproic acid. | 6-(2-amino-4-bromo-benzamido)hexanoic acid. |
| XIV | 4-fluoroisatoic anhydride. | ----do---- | 6-(2-amino-4-fluoro-benzamido)hexanoic acid. |

We claim:

1. A compound selected from the group consisting of those having the formula:

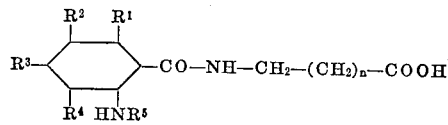

wherein each of $R^1$, $R^2$, $R^3$ and $R^4$ is selected from the group consisting of hydrogen, lower alkyl, lower alkoxy, amino, nitro, halo; $R^5$ is hydrogen; and $n$ is an integer from 2 to 6.

2. A compound in accordance with claim 1, which compound is 6-(2-aminobenzamido)hexanoic acid.

3. A compound in accordance with claim 1, which compound is 6-(2-amino-5-chlorobenzamido)hexanoic acid.

4. A compound in accordance with the claim 1, which compound is 6-(2-amino-5-nitrobenzamido)hexanoic acid.

5. A compound in accordance with claim 1, which compound is 5-(2-aminobenzamido)valeric acid.

6. A compound in accordance with claim 1, which compound is 5-(2-amino-5-nitrobenzamido)valeric acid.

7. A compound in accordance with claim 1, which compound is 4-(2-aminobenzamido)butyric acid.

8. A compound in accordance with claim 1, which compound is 4-(2-amino-5-nitrobenzamido)butyric acid.

References Cited

UNITED STATES PATENTS 3,206,439   9/1965   Detoro et al. _____ 260—518

LORRAINE A. WEINBERGER, Primary Examiner

L. A. THAXTON, Assistant Examiner

U.S. Cl. X.R.

260—244, 519; 424—319